F. L. MARTINDALE.
RECORDER.
APPLICATION FILED NOV. 1, 1915.
1,244,113.
Patented Oct. 23, 1917.
3 SHEETS—SHEET 1.
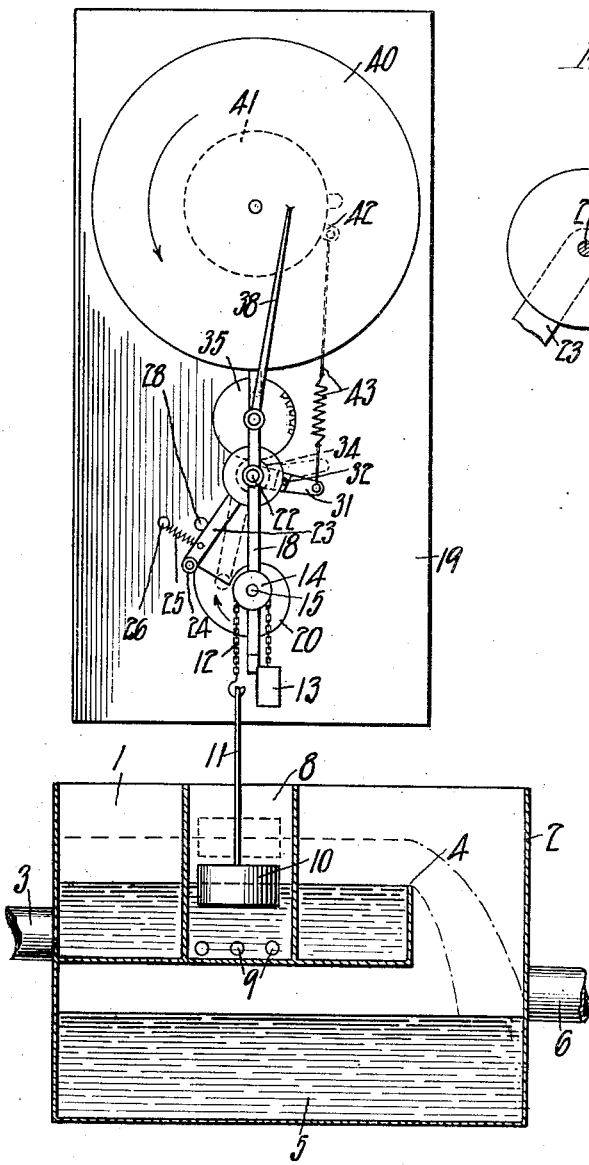
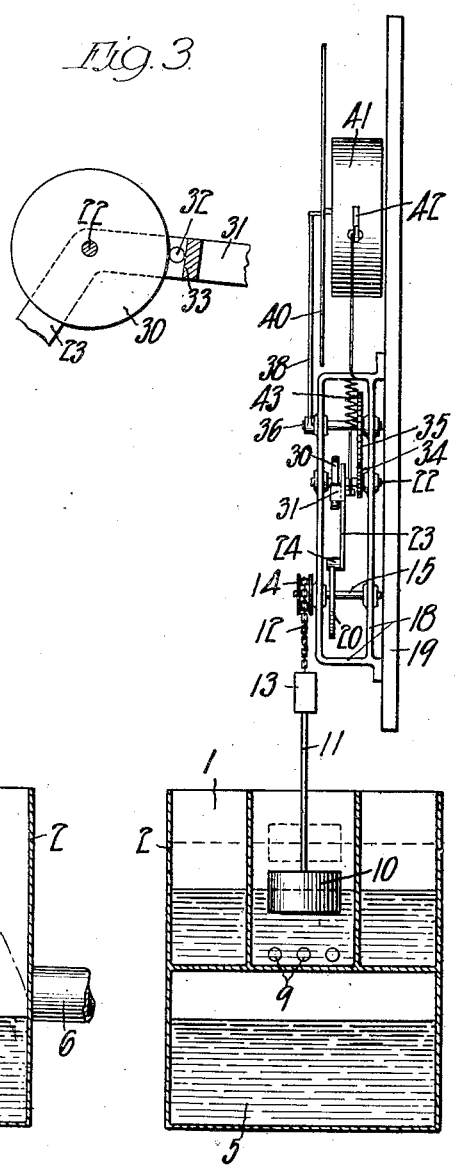
Witnesses
EP.B.
E.R.Barrett
Inventor
Frank L. Martindale,
By Pagelsen & Spencer
Attorneys

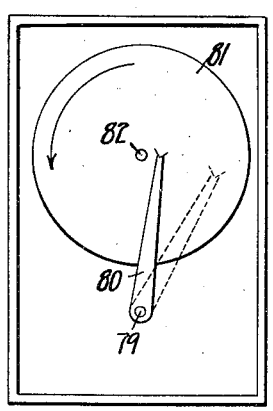
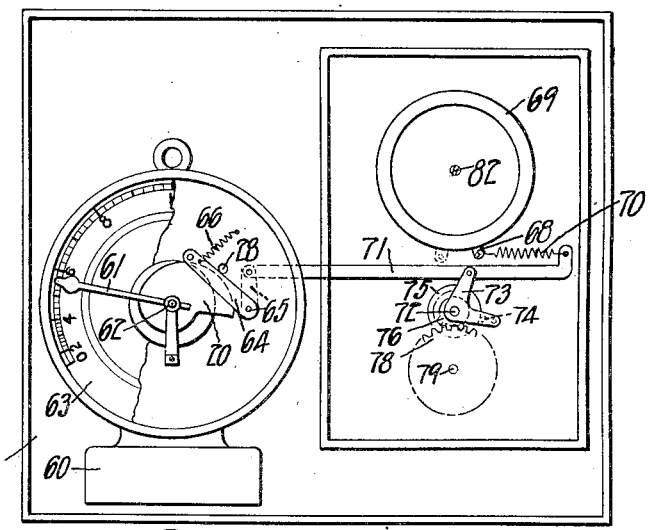
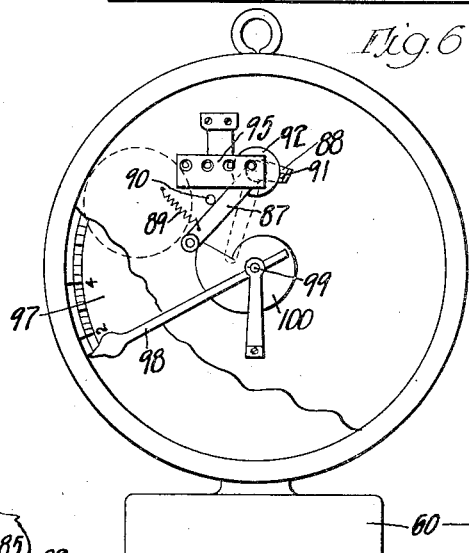
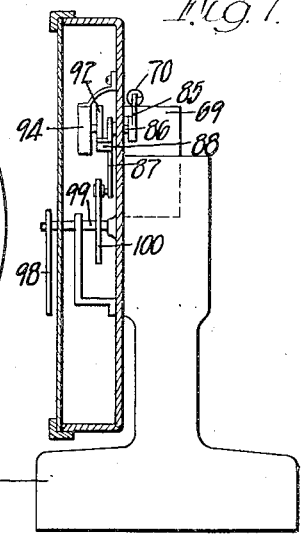
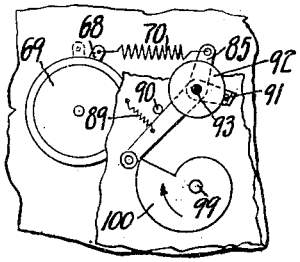

F. L. MARTINDALE.
RECORDER.
APPLICATION FILED NOV. 1, 1915.

1,244,113.

Patented Oct. 23, 1917.
3 SHEETS—SHEET 3.

Inventor
Frank L. Martindale,
By Pagelsen & Spencer
Attorneys

Witnesses

UNITED STATES PATENT OFFICE.

FRANK L. MARTINDALE, OF BAY CITY, MICHIGAN.

RECORDER.

1,244,113.  Specification of Letters Patent.  Patented Oct. 23, 1917.

Application filed November 1, 1915. Serial No. 58,959.

*To all whom it may concern:*

Be it known that I, FRANK L. MARTINDALE, a citizen of the United States, residing at Bay City, in the county of Bay and State of Michigan, have invented a new and useful Recorder, of which the following is a specification.

The present invention relates to a device whereby the summation of a variable quantity may be indicated or recorded, and the principle of its operation, broadly stated, resides in adding to the summation at predetermined intervals amounts equal to the value or rate of the quantity at the particular time. The invention is particularly applicable to meters for measuring the flow of liquids and other fluids and comprises, an arm or member arranged to swing or move in a given path at predetermined intervals and a cam controlled by or associated with an element responsive to the varying rate of flow, whereby the amount of movement of the arm is limited to correspond to the rate of flow, together with an indicating, recording or registering device by which the total movement of the arm or member is shown. The invention further consists in the details of construction shown, described and claimed.

Figure 9:
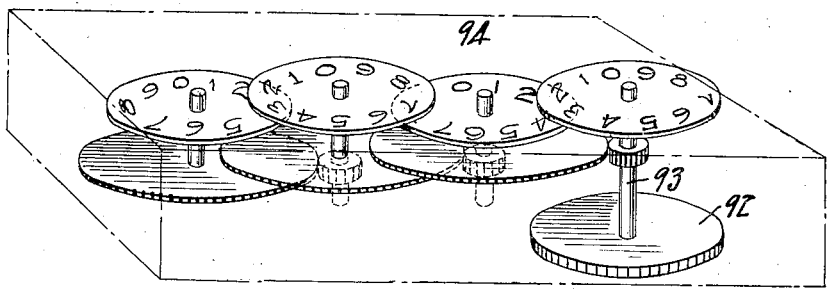
Figure 11:
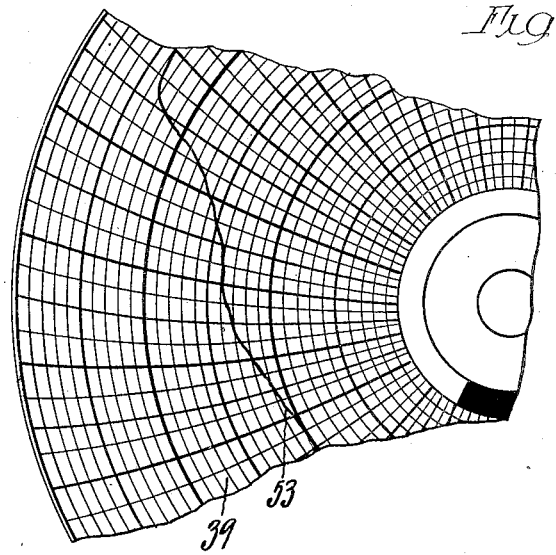
Figure 10:
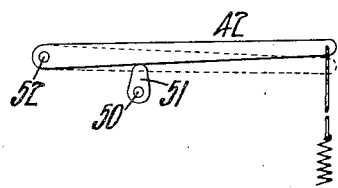

In the drawings, Figure 1 is a part front view, part vertical section through an embodiment of my invention whereby the flow of liquid may be recorded on a dial. Fig. 2 is a view at right angles to Fig. 1. Fig. 3 is a detail of a preferred form of ratchet construction between the time controlled lever and the gears that rotate the pen arm. Fig. 4 is a front view showing the invention applied to a steam or gas flow meter, the dial, dial plate and pen being removed. Fig. 5 is a front view of the dial, dial plate and pen with which the device shown in Fig. 4 is provided. Fig. 6 is a front view of an embodiment wherein the flow through a steam or gas flow meter is registered on a counting mechanism. Fig. 7 is a fragmentary vertical section corresponding to Fig. 6. Fig. 8 is a diagrammatic front elevation showing in detail the relation of the clock, ratchet, counter and cam shown in Figs. 6 and 7. Fig. 9 is a perspective view of one form of counting mechanism which may be used. Fig. 10 is an elevation of a preferred mechanism whereby the clockwork is caused to actuate an arm upon which the operation of the device depends. Fig. 11 is a fragmentary front elevation of the dial.

Similar reference characters indicate like parts.

Referring to Figs. 1 and 2, the liquid that enters the upper chamber 1 of a tank 2 through a pipe or conduit 3 from any suitable source flows over a weir 4 and is discharged into the lower chamber 5, from which it passes away through the conduit 6. A notch or orifice may of course be substituted for the weir. The upper chamber is provided with a float compartment 8 to which the liquid finds access through the openings 9. A float 10, to the rod 11 of which is attached a flexible connecter 12, is counterbalanced by a weight 13 and, by the medium of the drum 14, imparts angular movement to the shaft 15 corresponding to the variations in depth of the liquid in the upper chamber.

The shaft 15 is journaled in a frame 18 carried by the base 19, and has rigid therewith a cam 20 cut to correspond to the actual amount of liquid that passes the weir or notch 4 at the different depths. It will be seen that the cam turns clockwise from the initial position (Fig. 1) as the liquid rises in the upper chamber. Also journaled in the frame 18 at a point above the shaft 15 is a shaft 22, on which a cam-striking arm 23 is loosely mounted, said arm preferably including a roller 24 by which friction upon the cam is lessened. A spring 25, anchored at 26, normally holds the arm in engagement with a suitable stop 28, the latter being so located that when the cam is in the initial position shown no movement can be given the arm 23 in either direction.

Rigid with the shaft 22 is the ratchet wheel or disk 30, and loosely mounted on the shaft is the lever rocking arm 31 integral with the cam-striking arm 23, and the arm 31 is adapted to impart counter-clockwise step-by-step movement to the wheel 30 by means of the roller 32 and inclined face 33. The arm, of course, turns freely about the wheel in the opposite direction. As is obvious, various other types of ratchets may be used. Any counter-clockwise movement of the shaft 22 is transmitted in the reverse direction by reducing gears 34 and 35 to the pen shaft 36 and pen 38, the latter of which sweeps across a chart 39 (Fig. 11) on an arc passing through the center thereof. The chart is attached to a dial 40 that is preferably rotated in a counter-clockwise direction by a time controlled mechanism 41 of any desired construction; and the same mechanism elevates at predetermined intervals (say each minute) a lever 42 from which the lever 31, including the cam striking arm 23, is actuated by the spring link 43, that affords the resiliency necessary to compensate for the varying throw of the arm 23 against the cam—putting it another way, the time controlled mechanism at predetermined intervals draws the arm 23 counterclockwise (Fig. 1) from the stop 28 until it strikes the particular portion of the surface of the cam 20 which is then presented toward it.

Any desired mechanism may be employed for swinging the lever 42 but that shown in Fig. 10 is deemed preferable. As indicated therein, the minute hand shaft 50 of the mechanism 41 has attached thereto a cam 51 upon which the lever 42 rests, the latter being pivoted at 52. This construction is both cheap and reliable.

From the foregoing, it will be seen that any single movement of the arm 23 (and of the pen) is proportional to the rate of flow of the liquid at that instant; that the successive movements added together are proportional to the total flow for the period; and that the pen will scribe on the chart, when the latter is drawn to the proper scale, a spiral-like curve 53 (Fig. 11) the radial distance of any point of which from the origin is expressive of the total flow. It will also be apparent that the inclination of the curve at any point in respect to the corresponding radius of the chart, is a measure of the rate of flow at the particular instant.

The present invention may also be applied to a steam or gas flow meter in the manner shown in Figs. 4 and 5, in which 60 indicates a well known type of meter having a pointer 61 secured to a shaft 62 and arranged to sweep in clockwise direction over a dial 63 calibrated in accordance with the rate of flow through the meter. A cam 20 similar to that previously described is rigid with the shaft 62 and limits the throw of a bell crank 64 about the pivot 65. As before, a spring 66 normally holds the cam striking arm of the bell crank in initial position, and the latter is swung against the cam at intervals by the intermittently actuated arm 68 of a time controlled device 69 through the medium of the spring 70 and link 71. Loosely mounted on a shaft 72 and pivotally connected to the link 71 is a ratchet lever 73 from which motion is communicated by a roller 74 to the ratchet disk 75 in the manner heretofore described. A train of reduction gearing 76—78 transmits this movement in clockwise direction to the pen shaft 79 and pen 80 (Fig. 5) by which the recording curve is drawn on the chart 81, it being understood that the latter is rotated by the main shaft 82 of the time mechanism. Both meter and recording device may be mounted in a single case 83 of suitable form.

In the embodiment shown in Figs. 6, 7, 8 and 9, the invention is again applied to a steam or gas meter 60, a counter being used in lieu of the pen and chart. The intermittently actuated arm 68 of the clock 69, in this instance, acting on the spring 70 swings the arm 85, shaft 86, cam-striking arm 87 and ratchet arm 88 (the two last mentioned members preferably being integral) in counter-clockwise direction against the tension of the spring 89 that normally holds the arm 87 in engagement with the stop 90. This movement is transmitted by means of the roller or ball 91 to the ratchet disk 92, the latter being secured to the unit shaft 93 of the counter 94 of any desired form (Fig. 9), the numerals being readable through small holes in the front plate 95 (Fig. 6). A dial 97 is calibrated in accordance with the varying movement imparted to the pointer 98 at the different rates of flow of fluid, and the pointer shaft 99 bears the cam 100 cut in accordance with the said varying movement, whereby the angular throw of the arm 87 is made to correspond to the rate indication of the pointer, or in other words, to the actual rate of flow through the meter at all times. The summation of the successive movements of the arm 87 is of course directly readable from the counter at any time.

The words "exhibited" and "exhibiting" as used in the claims, are intended to be the equivalent respectively of "recorded, registered or indicated" and "recording, registering or indicating."

It is clear that many changes in the construction without departing from the spirit of my invention may be made. I do not, therefore, wish to be limited otherwise than as indicated by the subjoined claims.

I claim:—

1. In combination with an instrumentality concerning which information is desired, a member movable as a given condition of the instrumentality changes, a cam movable with the member, said cam being shaped in accordance with the value of the condition at the different points in the movement of the member, a second member movable at predetermined intervals from an initial position into engagement with the cam, a movable member of an exhibiting device, and means for imparting to the last mentioned movable member a movement representative of the summation of the several movements of the second member, whereby the summation of the condition may be exhibited.

2. In combination with an instrumentality concerning which information is desired, a rotatable shaft, and means for rotating the shaft as a given condition of the instrumentality changes, a cam movable with the shaft, said cam being shaped in accordance with the value of the condition at the different points in the movement of the shaft, a member movable at predetermined intervals from an initial position into engagement with the cam, a movable member of an exhibiting device, and means for imparting to the last mentioned movable member a movement representative of the summation of the several movements of the intermittently movable member, whereby the summation of the condition may be exhibited.

3. In combination with an instrumentality concerning which information is desired, a rotatable shaft, and means for rotating the shaft as a given condition of the instrumentality changes, a cam movable with the shaft, said cam being shaped in accordance with the value of the condition at the different points in the movement of the shaft, a second shaft, a cam-striking arm secured to the second shaft, means for moving the cam-striking arm at predetermined intervals from an initial position into engagement momentarily with the cam, the amount of the several movements being determined by the cam, a movable member of an exhibiting device, means for imparting to the last mentioned movable member a movement representative of the summation of the several movements of the intermittently movable member, whereby the summation of the condition may be exhibited, and means for rendering the movement of the exhibiting member intelligible.

4. In combination with an instrumentality concerning which information is desired, a member movable as a given condition of the instrumentality changes, a cam movable with the member, said cam being shaped in accordance with the value of the condition at the different points in the movement of the member, a second member movable at predetermined intervals from an initial position into engagement momentarily with the cam, the amount of the several movements being determined by the cam, a movable member of an exhibiting device, and means for imparting to the last mentioned movable member a movement representative of the summation of the several movements of the second member, whereby the summation of the condition may be exhibited.

5. In combination with an instrumentality concerning which information is desired, a rotatable shaft, and means for rotating the shaft as a given condition of the instrumentality changes, a cam movable with the shaft, said cam being shaped in accordance with the value of the condition at the different points in the movement of the shaft, a second shaft, a cam-striking arm secured to the second shaft, means for positively moving the cam-striking arm at predetermined intervals to and from engagement momentarily with the cam, the amount of the several movements being determined by the cam, a movable member of an exhibiting device, ratchet means for imparting to the last mentioned movable member a movement representative of the summation of the several movements of the intermittently movable member, whereby the summation of the condition may be exhibited, and means for rendering the movement of the exhibiting member intelligible.

6. A fluid flow meter comprising a shaft movable in response to the presence of the fluid, a cam movable with the shaft, said cam being shaped in accordance with the amount of fluid passing the meter at the different positions of the fluid responsive shaft, a second shaft, a pivoted cam-striking arm, and time controlled means for swinging the arm from an initial position in which it is out of engagement with the cam to a position in which it is in engagement with said cam at predetermined intervals whereby a series of forward-and-back movements is imparted thereto corresponding to the rates of flow of fluid at the particular instants, and means for determining the summation of the several movements.

7. A fluid flow meter comprising a shaft movable in response to the presence of the fluid, a cam movable with the shaft, said cam being shaped in accordance with the amount of fluid passing the meter at the different positions of the fluid responsive shaft, a second shaft, a cam-striking arm loosely mounted thereon, a spring normally holding the arm out of engagement with the cam, a ratchet wheel movable with the shaft, time controlled means for causing the cam-striking arm to move at intervals into engagement with the cam, means for imparting to the ratchet wheel a movement corresponding to the summation of the individual movements of the cam-striking arm, and means whereby the movement of the ratchet wheel is made expressive of the quantity of fluid that has passed the meter.

In testimony whereof I sign this specification.

FRANK L. MARTINDALE.